United States Patent [19]

Underwood et al.

[11] 3,739,644
[45] June 19, 1973

[54] LINEARIZATION OF DIFFERENTIAL PRESSURE INTEGRAL SILICON TRANSDUCER

[75] Inventors: Joe B. Underwood; Alexander J. Yerman, both of Scotia, N.Y.

[73] Assignee: General Electric Company, Schenectady, N.Y.

[22] Filed: June 30, 1972

[21] Appl. No.: 267,916

[52] U.S. Cl. .... 73/398 AR, 73/88.5 SD, 73/407 R, 338/4
[51] Int. Cl. ............................................. G01l 9/02
[58] Field of Search ............... 73/398 AR, 407 R, 73/88.5 SD; 338/4, 42

[56] References Cited
UNITED STATES PATENTS 2,784,593  3/1957  Peucker .......................... 338/42
3,537,319  11/1970  Yerman ........................ 73/398 AR Primary Examiner—Donald O. Woodiel
Attorney—John F. Ahern, Julius J. Zaskalicky and Donald R. Campbell

[57] ABSTRACT

An integral silicon transducer suitable for measuring low differential fluid pressures utilizes a pair of pressure-biased silicon diaphragms coupled by a fill liquid. When sensing a differential pressure, the diaphragms flex to respectively increase and decrease the strain level. By subtracting the individual output signals of the two diaphragms, a more linear transducer output signal is obtained even though the individual diaphragm output signals are nonlinear. A special strain gage pattern is not required, but a unitary fully active bridge is desirable.

10 Claims, 6 Drawing Figures

LINEARIZATION OF DIFFERENTIAL PRESSURE INTEGRAL SILICON TRANSDUCER

BACKGROUND OF THE INVENTION

This invention relates to integral silicon transducers for gaging differential pressures, and more particularly to a pressure transducer with a pair of silicon diaphragms operated in push-pull fashion to produce a more linear output voltage at low pressure ranges.

Integral silicon transducers commonly employ a single clamped-edge silicon diaphragm that is deflected as a function of the differential fluid pressure applied to opposite surfaces of the active diaphragm. The integrally formed semiconductor strain gages exhibit a change in resistance when strained and yield a measure of the applied pressure. The strain, as well as the output voltage of a resistance bridge used to gage the pressure, are relatively linear so long as the deflection at the center of the diaphragm does not exceed approximately one-fifth its thickness. Analytically, the active diaphragm can be treated as a flat circular plate in which only the bending stresses are significant inasmuch as the membrane stresses are negligible. To measure very low pressures, the sensitivity of the diaphragm to pressure is increased by making it relatively thin as compared to its radius. Thin diaphragms for measuring low pressures, however, show appreciable deflection and are characterized by a non-linear strain and output voltage due to the generation of significant membrane stresses in addition to the bending stresses. The magnitude of the nonlinearity is a direct function of the deflection-to-thickness ratio.

A linear integral silicon transducer for measuring very low pressures with a single silicon diaphragm is obtained by locating the strain gages at the unique radial position ($r/a = 0.54$) at which the strain is substantially linear. Improved linearity of output voltage in another gage pattern with central and outer gages on a single diaphragm is also obtained by locating the outer gages closer to the edge. These are described in copending application Ser. No. 257,539 filed May 30, 1972 by the same inventors, assigned to the same assignee, entitled "Integral Silicon Diaphragms for Low Pressure Measurements." The present invention is directed to a linear differential pressure transducer using a pair of silicon diaphragms with no requirement for a special gage pattern.

SUMMARY OF THE INVENTION

A differential pressure integral silicon transducer constructed in accordance with the invention comprises a mounting member, typically a cylindrical tube, enclosed by a pair of restrained-edge silicon diaphragms. The mounting member is filled with a pressure transmitting liquid or other fluid that desirably exerts a pressure bias on each diaphragm. Each silicon diaphragm has one or more integrally formed semiconductor strain gages that exhibits a change in resistance as the diaphragm flexes. When sensing a differential pressure applied to the pair of diaphragms, one flexes to increase the strain level generated in the diaphragm while in the other the strain level decreases. Circuit means is connected to each diaphragm, preferably in the form of a resistance bridge, to obtain an individual output signal indicative of the pressure difference across each diaphragm, which is one-half the total differential pressure. The individual output signals are effectively subtracted in a suitable difference circuit to obtain a transducer output signal with improved linearity.

The integral silicon pressure transducer utilizing a pair of push-pull diaphragms is most useful for the measurement of low differential pressures. Silicon diaphragms with a high radius-to-thickness ratio used to sense very low pressures generate a nonlinear individual output signal due to the inherent mechanical nonlinearity of the diaphragm. Significant improvement in linearity of the transducer output signal is obtained without using a special gage pattern. A unitary full bridge gage pattern is disclosed but is not essential to the practice of the invention. For optimum linearity the two diaphragms have matched mechanical and electrical characteristics.

DESCRIPTION OF THE PREFERRED EMBODIMENTS

Figure 1:
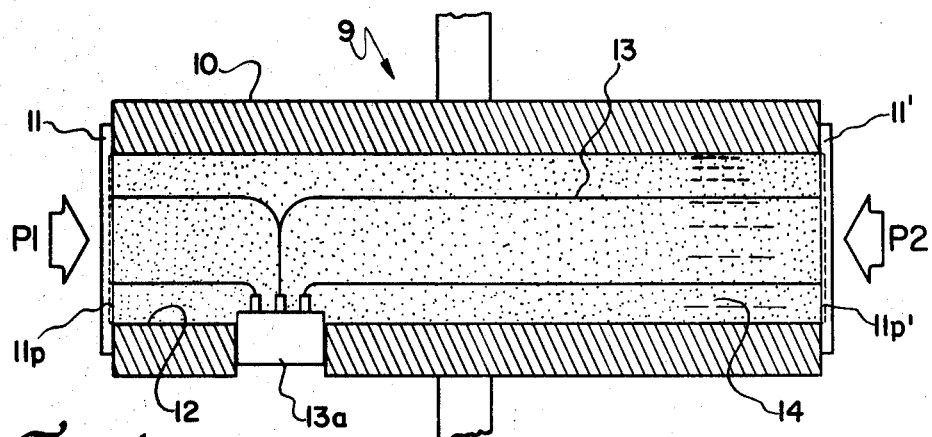
FIG. 1 is a diagrammatic cross-sectional view of a transducer diaphragm assembly for sensing low differential pressures constructed with a pair of push-pull silicon diaphragms.

Referring to FIG. 1, a differential pressure integral silicon transducer constructed in accordance with the invention comprises a pressure sensing transducer diaphragm assembly 9 that is suitably mounted for measuring the fluid differential pressure (P1–P2). Transducer diaphragm assembly 9 includes a hollow, liquid-filled mounting member 10 enclosed at either end by a pair of integral silicon diaphragms 11 and 11'. Mounting member 10 is typically a cylindrical tube with an inner diameter 12 that determines the active diameter of the two silicon diaphragms 11 and 11' secured at their edges to either end of the tube. To mount transducer diaphragm assembly 9 to sense the differential pressure, mounting tube 10 by way of example extends through a small aperture in a partition wall separating a chamber containing a first fluid at the pressure P1 and a chamber containing a second fluid at the pressure P2. As is known in the art, opposite conductivity type semiconductor strain gage patterns 11p and 11p' are formed integrally in or on the inner surfaces of the respective silicon diaphragms 11 and 11'. A plurality of lead wires 13 make connection to the semiconductor strain gage pattern on each diaphragm and extend through the fill liquid 14 to be connected at the other end to a multi-pin electrical connecter 13a extending through the wall of mounting tube 10.

Figure 2:
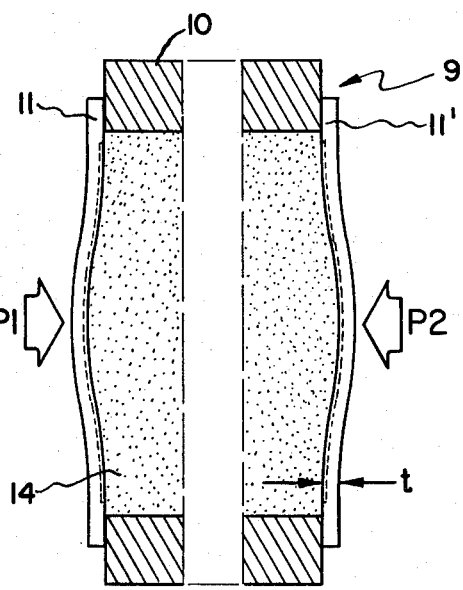
FIG. 2 is a fragmentary cross section similar to FIG. 1 showing to an enlarged scale the deflection of the silicon diaphragms due to the pressure bias provided by the fill liquid.

Fill liquid 14 is suitably an oil or other electrically insulating liquid or fluid that is incompressible at relatively low pressures. As the exaggerated showing in FIG. 2 illustrates, the fill liquid completely fills the hollow interior of transducer double-diaphragm assembly 9 and has a slight overpressure so as to exert a pressure bias on each of the silicon diaphragms 11 and 11', flexing them outwardly. It is preferred that the pair of diaphragms be matched as to their physical and electrical characteristics, so that both diaphragms are flexed to the same extent and generate approximately the same strain levels at zero differential pressure. Exposure of transducer diaphragm assembly 9 to a fluid pressure differential causes one diaphragm to flex further outwardly, increasing the strain level, while the other diaphragm flexes inwardly decreasing the strain level. For example, when pressure P1 is greater than pressure P2, diaphragm 11 flexes inwardly and conversely diaphragm 11' flexes outwardly. The pressure differential is, of course, transmitted from one diaphragm to the other by the incompressible fill liquid 14. On the other hand, when P2 exceeds P1, diaphragm 11' relaxes inwardly while diaphragm 11 is flexed outwardly. Consequently, the output voltages indicative of the strain levels in the two silicon diaphragms increases in one case and decreases in the other case. By subtracting the individual output voltages, the transducer output signal indicative of the differential pressure is increased by a factor of two for a given strain level and, even more importantly, has improved linearity. This is explained in greater detail later on in regard to FIGS. 4 and 5. The differential pressure is applied equally to each of the two silicon diaphragms, so that the differential pressure appearing across each diaphragm, for which it must be designed to handle, is approximately ½ (P1–P2).

The differential pressure integral silicon transducer here described with a pair of pressure sensitive diaphragms operated in push-pull fashion to produce a more linear output voltage is especially advantageous for the measurement of relatively low pressure differentials. To measure low pressure differentials of approximately 5 lbs/sq. in. and less, the sensitivity of the diaphragm to pressure is increased by selecting the radius $a$ of the active diaphragm and its thickness $t$ such that the ratio $a/t$ is large, at least 10 or more. This is accomplished by making the active diaphragm radius relatively large, by making the diaphragm very thin, or by a combination of the two. Diaphragms of single crystal silicon are advantageous in this respect since a wafer can be cut as thin as 5 or 6 microns. From a cost standpoint the active diaphragm diameter of a defect-free sample should be one-quarter inch or less. As was previously mentioned, relatively thin silicon diaphragms for low pressure measurements have non-linear strain and output voltage characteristics. This non-linearity is present even though the strain gage elements are perfectly linear. The non-linearity of such a diaphragm is generally negative, and can best be described as being caused by membrane stresses generated in the neutral plane when the deflection of the center of the diaphragm exceeds approximately one-fifth of its thickness, $t$. The magnitude of the non-linearity in output voltage of a single silicon diaphragm due to this cause is a direct function of the ratio $w/t$, where $w$ is the deflection of the diaphragm center. For a more complete discussion, the reader is referred to the aforementioned copending application, Ser. No. 257,539.

Figure 3:
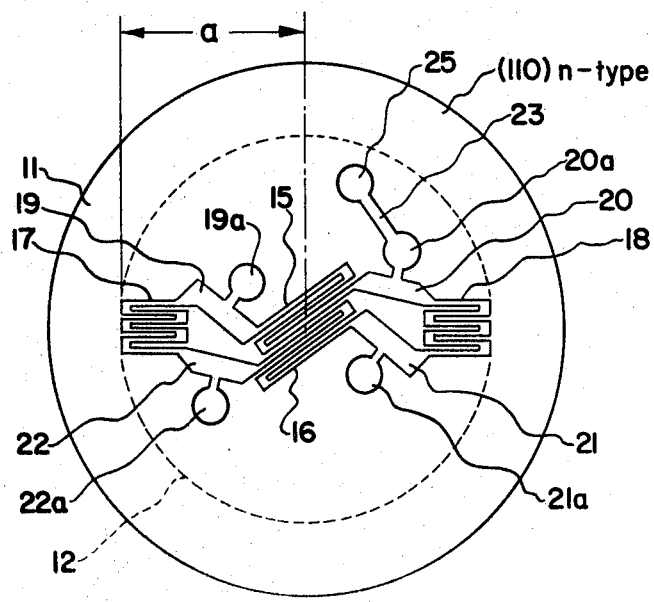
FIG. 3 is a plan view of one of the integral silicon diaphragms shown in FIG. 1 using, by way of illustration, a unitary full bridge gage pattern with skewed central and outer strain gages.

A variety of integrally formed semiconductor strain gage patterns 11p and 11p' can be utilized in the practice of the invention. These include a pattern with four strain gages connected either on the diaphragm itself or externally in a full bridge Wheatstone configuration, a pattern with two strain gages connected either on the diaphragm or externally as a half bridge resistance measuring circuit, or a single strain gage. The best results and a more linear output voltage is obtained, however, by using a full bridge resistance measuring circuit with four semiconductor strain gages. A desirable unitary bridge pattern is shown in FIG. 3. This integral silicon diaphragm, with a skewed arrangement of the central and outer gages along particular crystallographic directions for optimum strain sensitivity, is described in U.S. Pat. No. 3,537,319 to A. J. Yerman, granted Nov. 3, 1970, and assigned to the assignee of the instant invention. Accordingly, only a brief description will be given.

Silicon diaphragm 11 shown in plan view in FIG. 3 is made from a thin wafer of (110) plane in n-type single crystal semiconductor material. The outer edges of the diaphragm are restrained by being secured to the end of mounting tube 10 such that only the circular central portion of the diaphragm within the dashed line 12 is free to flex in response to an applied stress. The p-type gage pattern 11p is formed on one surface of the n-type substrate by integrated circuit techniques well known in the semiconductor art. The gage pattern includes two central strain gages 15 and 16 located at or adjacent the center of the active diaphragm, and two outer strain gages 17 and 18 located toward the outer edges of the active diaphragm. All four strain gages are active gages, and both central gages are subjected to compressive stresses while the two outer gages are subjected to tensile stresses. Strain gages 15–18 are connected in a unitary full bridge circuit arrangement by means of four relatively low resistance connection areas 19–22. Each of these low resistance connection areas is respectively connected by a small neck to the associated contact pads 19a–22a. As a temperature compensating feature, a series resistance strip 23 oriented in a non-strain sensitive direction is also connected to contact pad 20a and is terminated by another contact pad 25 so that it is available if required. With this arrangement, it is seen that the strain gage elements are connected in a Wheatstone bridge configuration wherein each of the individual strain gages is a variable resistance, and the output voltage is sensed between the opposing contact pads 19a and 21a while the d-c supply voltage is supplied between contact pads 22a and 20a (see also FIG. 4). Current flows only through those p-type elements on diaphragm 11 that are in circuit with the supply voltage due to the existence of a p-n rectifying barrier between the opposite conductivity gage pattern and substrate. Although not here illustrated, another desirable unitary full bridge gage pattern is the "in-line" pattern described in the previously identified copending application Serial No. 257,539. In this gage pattern, the outer gages 17 and 18 are oriented in the same crystallographic direction as the central gages 15 and 16.

Figure 4:
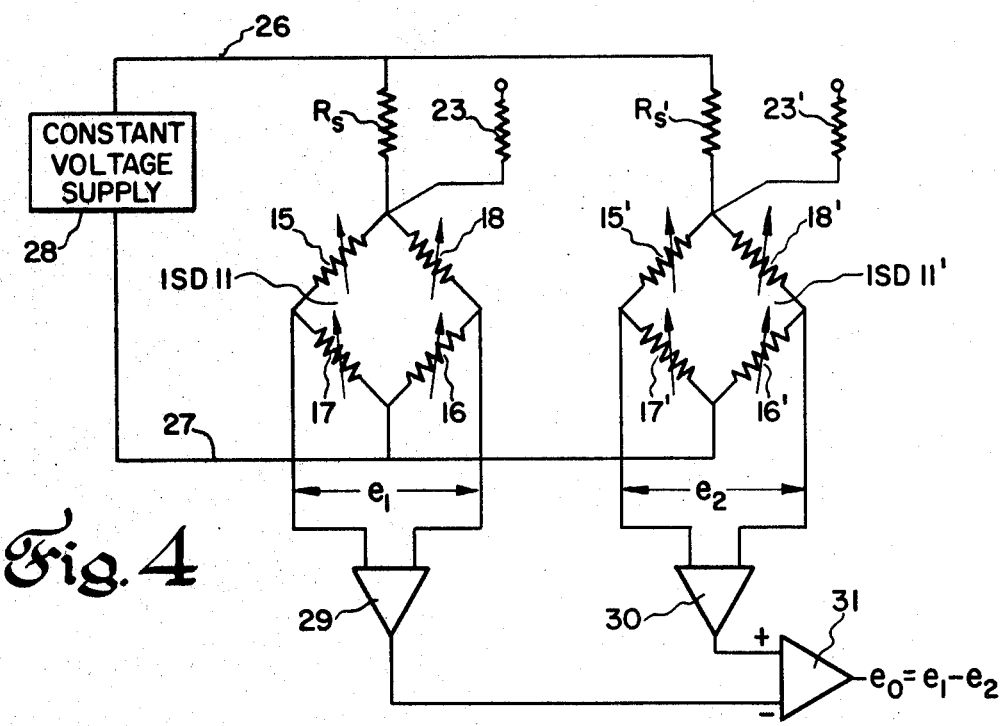
FIG. 4 is a schematic circuit diagram of the complete pressure transducer showing the two resistance bridges representing the circuit equivalents of the full bridge gage pattern on each silicon diaphragm, with provision to subtract the unbalance signals of the two diaphragms to obtain a more linear output voltage.

The other integral silicon diaphragm 11' is similarly provided with an identical unitary full bridge gage pattern including four active strain gage elements 15'–18' and a non-strain sensitive series resistance strip 23'. The circuit diagram of the complete differential pressure transducer, with provision for subtracting the individual output voltages of the two bridge circuits, is shown in FIG. 4. The unitary resistance bridge circuit on ISD 11 and the substantially identical unitary resistance bridge circuit on ISD 11' are both energized by connection between the terminals 26 and 27 of a constant voltage supply 28. In one method of temperature compensation, external series resistors $R_s$ and $R_s'$ are selected and placed in series with the bridge. The purpose of these resistors which have a temperature coefficient of resistance which is very small in comparison with that of the bridge resistors (which is positive), is to provide a sufficiently high voltage to the bridge as temperature increases to compensate for decreased strain gage sensitivity at higher temperatures. While other temperature compensation methods are possible, some of which include the use of resistors 23 and 23', they are not considered relevant to the current disclosure and therefore, will not be described in detail. The individual output voltages $e_1$ and $e_2$ of the respective integral silicon diaphragms vary non-linearly with changes in the applied differential pressure being measured. Although not essential, output signals $e_1$ and $e_2$ are preferably amplified by the respective buffer amplifiers 29 and 30. The buffer amplifiers provide capability for impedance matching, gain adjustment, and isolation, if needed. The amplifier and matched individual output voltages $e_1$ and $e_2$ are subtracted in a differential amplifier circuit 31 or other suitable difference circuit to obtain the transducer output voltage $e_o$, which is indicative of the measured differential pressure. Buffer amplifiers 29 and 30 and differential amplifier 31 can be conventional components such as suitable solid state integrated circuit amplifiers.

Figure 5:
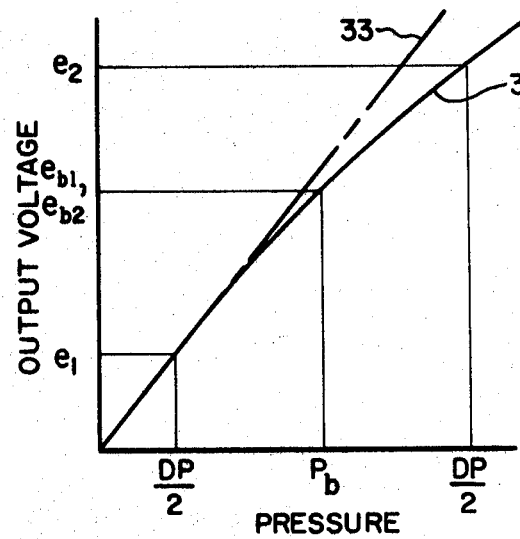
FIG. 5 illustrates a typical nonlinear output voltage-pressure characteristic for the pair of integral silicon diaphragms, assuming a matched pair, and is useful in explaining the principle of the invention.

The output voltage-pressure characteristic shown in FIG. 5 is useful in explaining the principles of the invention. Assuming that the pair of integral silicon diaphragms are perfectly matched, the non-linear characteristic 32 represents the variation in output voltage with respect to pressure for each of the integral silicon diaphragms. The non-linearity is negative, such that characteristic 32 is concave downwardly, due to the generation of significant membrane stresses in addition to bending stresses in diaphragms with a high $a/t$ ratio for the measurement of low pressure differentials. By comparison with the linear output voltage-pressure characteristic shown at 33, it is seen that the amount of non-linearity becomes larger with increasing pressures. At increasing pressures, the ratio $w/t$ of the deflection at the center of the diaphragm to the thickness of the diaphragm becomes greater. When the diaphragm is unstressed at zero pressure, as is usually the case, the unbalance of the output voltage of the resistance bridge circuit is also zero, assuming that the strain gage elements are matched. The effect of providing a pressure bias $P_b$ for the pair of integral silicon diaphragms 11 and 11' by means of the fill liquid 14 (FIG. 2) is that the output voltage of each resistance bridge circuit at zero differential pressure is now $e_b$. Since the same strain level is generated in both integral silicon diaphragms, it follows that the respective individual output voltages $e_{b1}$ and $e_{b2}$ are equal to one another and produce a zero transducer output voltage $e_o$ when they are subtracted. The magnitude of the pressure bias $P_b$ is preferably about one-half of the maximum pressure range, i.e., a differential pressure integral silicon transducer for the range 0–3 psi has a pressure bias of 1.5 psi. As was previously described, the applied fluid pressure differential is shared equally by each of the integral silicon diaphragms causing one diaphragm to flex outwardly, thus increasing its output voltage, while the other diaphragm relaxes inwardly, decreasing its individual output voltage. For the case in which the pressure P2 is greater than the pressure P1, the pressure change applied to each diaphragm is DP/2, and the corresponding output voltage $e_2$ is greater than $e_{b2}$, while output voltage $e_1$ is less than $e_{b1}$. These two individual diaphragm output voltages are subtracted by differential amplifier 31 to produce the transducer output voltage $e_o = e_2 - e_1$.

Figure 6:
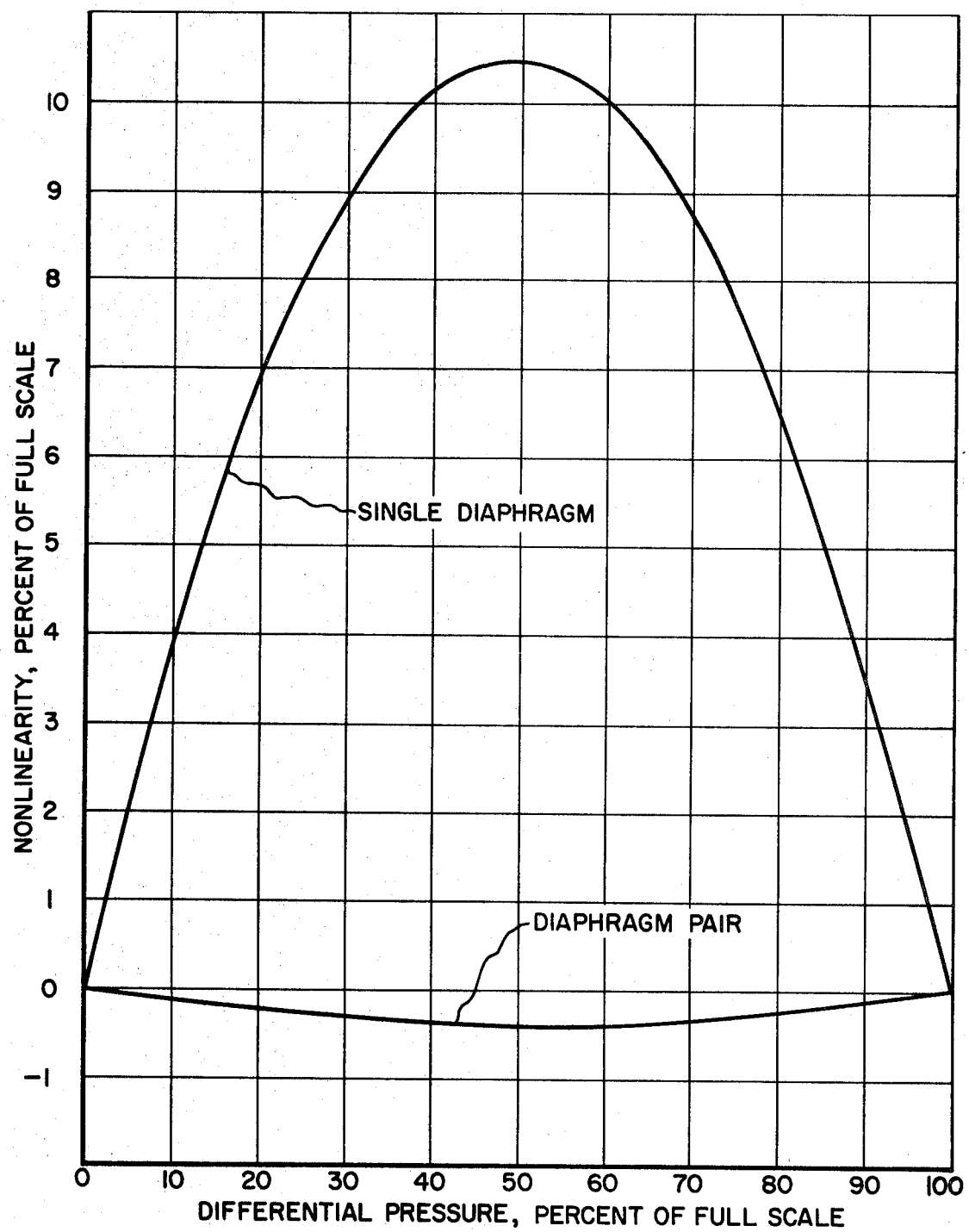
FIG. 6 illustrates by comparison the nonlinearity of a single diaphragm and a diaphragm pair with respect to differential pressure, in each instance as a percent of full scale, to illustrate the marked improvement in nonlinearity obtained by the diaphragm pair.

The improved linearity of transducer output signal produced by using a differential pressure integral silicon transducer with a pair of diaphragms operated in push-pull fashion is shown by the following table. By way of example, this arrangement wherein the outputs from the two diaphragms are subtracted shows a greater than 10:1 improvement in linearity for diaphragms selected for a 3 psi pressure range. The data given in the table, comparing the nonlinearity of a typical single diaphragm and a diaphragm pair, is plotted in FIG. 6.

It is evident from the discussion of FIG. 5 that the pair of integral silicon diaphragms 11 and 11' should be matched as closely as possible. Since variations in the diaphragm subsystem sensitivities will ordinarily occur in a manufacturing process, these can be readily

TABLE 1

Comparison between Nonlinearity of Single Diaphragm and Diaphragm Pair - Differential Pressure Range: 3 psi

| D P psi | Single diaphragm output signal Mv/V | Pct. Non-linearity | Diaphragm Pair Output Signal Mv/V | | | Pct. Non-linearity |
|---|---|---|---|---|---|---|
| | | | $e_2$ | $e_1$ | $(e_2 - e_1)$ | |
| 0 | 0 | 0 | 6.352 | 6.352 | 0 | 0 |
| 0.3 | 1.452 | 3.82 | | | | |
| 0.6 | 2.816 | 6.80 | 7.348 | 5.266 | 2.082 | −0.19 |
| 0.9 | 4.087 | 8.90 | | | | |
| 1.2 | 5.266 | 10.12 | 8.256 | 4.087 | 4.169 | −0.32 |
| 1.5 | 6.352 | 10.45 | | | | |
| 1.8 | 7.348 | 9.93 | 9.082 | 2.816 | 6.266 | −0.36 |
| 2.1 | 8.256 | 8.58 | | | | |
| 2.4 | 9.082 | 6.44 | 9.830 | 1.452 | 8.378 | −0.26 |
| 2.7 | 9.830 | 3.56 | | | | |
| 3.0 | 10.507 | 0 | 10.507 | 0 | 10.507 | 0 | handled by a suitable gain adjustment on buffer amplifiers 29 and 30. Small errors arising from the thermal expansion of fill liquid 14 are compensated for by the use of differential amplifier 31. Common mode signals applied to both inputs of such an amplifier are rejected. Optimum rejection of the common mode signals requires that the product of the subsystem comprising ISD 11 and the gain of buffer amplifier 29 be equal to the product of the subsystem comprising ISD 11' and the gain of buffer amplifier 30.

In summary, improved linearity of output signal results from the use of an integral silicon transducer for measuring differential pressures that employs a pair of push-pull silicon diaphragms in conjunction with an electrical circuit for subtracting the individual diaphragm outputs. Preferably, the two diaphragms are matched and pressure-biased by the fill liquid so that the individual outputs have the same sign. This pressure transducer is advantageous for measuring low differential pressures when the individual outputs, assuming a special gage pattern is not used, are inherently nonlinear.

While the invention has been particularly shown and described with reference to a preferred embodiment thereof, it will be understood by those skilled in the art that the foregoing and other changes in form and details may be made therein without departing from the spirit and scope of the invention.

What we claim as new and desire to secure by Letters Patent of the United States is:

1. A differential pressure integral silicon transducer comprising a mounting member enclosed by a pair of restrained-edge silicon diaphragms and completely filled with a pressure transmitting fluid, said silicon diaphragms each having at least one integrally formed semiconductor strain gage that exhibits a variable resistance as said diaphragms flex to respectively increase and decrease the strain level in response to sensing an applied differential fluid pressure, circuit means connected to each silicon diaphragm for obtaining an individual output signal, and a difference circuit for effectively subtracting said individual output signals to obtain a more linear transducer output signal indicative of the applied differential pressure.

2. A pressure transducer according to claim 1 wherein said pressure transmitting fluid is a liquid that provides a pressure bias to said pair of silicon diaphragms.

3. A pressure transducer according to claim 1 wherein said pair of silicon diaphragms are substantially mechanically and electrically matched.

4. A pressure transducer according to claim 3 wherein said mounting member is a cylindrical tube, said pair of silicon diaphragms being circular and respectively secured to either end of said tube.

5. A pressure transducer according to claim 3 further including a pair of buffer amplifiers for respectively processing each individual output signal, said difference circuit being a differential amplifier.

6. A pressure transducer according to claim 1 wherein each of said silicon diaphragms includes at least four of said integrally formed semiconductor strain gages, and said circuit means includes unitary low resistance connection areas and contact pads on each silicon diaphragm connected with said strain gages as a unitary resistance bridge circuit.

7. An integral silicon transducer for measuring low differential pressures comprising a transducer assembly including a mounting member enclosed by a pair of circular, restrained-edge silicon diaphragms and filled with a liquid providing a pressure bias thereto, said silicon diaphragms being substantially mechanically and electrically matched, and each having a plurality of integrally formed semiconductor strain gages that exhibit a variable resistance as said diaphragms flex to respectively increase and decrease the stain level in response to sensing an applied differential pressure, circuit means for connecting the strain gages on each silicon diaphragm in a resistance bridge circuit with an individual output voltage that varies nonlinearly with the applied differential pressure, and a difference circuit for effectively subtracting said nonlinear individual output voltages to obtain a more linear transducer output voltage.

8. A pressure transducer according to claim 7 wherein said pair of silicon diaphragms have substantially matched individual output voltage-pressure characteristics.

9. A pressure transducer according to claim 8 further including a pair of adjustable gain buffer amplifiers for respectively processing each of said individual output voltages, said difference circuit being a differential amplifier.

10. A pressure transducer according to claim 8 wherein each of said silicon diaphragms comprises four of said integrally formed semiconductor strain gages, and said circuit means includes unitary low resistance connection areas and contact pads on each silicon diaphragm connected with said strain gages as a unitary resistance bridge circuit.

* * * * *